United States Patent
Choi et al.

(10) Patent No.: US 11,849,034 B2
(45) Date of Patent: Dec. 19, 2023

(54) APPARATUS AND METHOD FOR GENERATING IDENTIFICATION KEY

(71) Applicants: ICTK Holdings Co., Ltd., Seongnam-si (KR); IUCF-HYU (Industry-University Cooperation Foundation Hanyang University), Seoul (KR)

(72) Inventors: Byong Deok Choi, Seoul (KR); Dong Kyue Kim, Seoul (KR)

(73) Assignees: ICTK Holdings Co., Ltd., Seongnam-si (KR); IUCF-BYU (Industry-University Cooperation Foundation Hanyang University), Seongnam-si (KR)

( * ) Notice: Subject to any disclaimer, the term of this patent is extended or adjusted under 35 U.S.C. 154(b) by 128 days.

(21) Appl. No.: 17/374,626

(22) Filed: Jul. 13, 2021

(65) Prior Publication Data

US 2021/0344490 A1 Nov. 4, 2021

Related U.S. Application Data

(63) Continuation of application No. 15/773,492, filed as application No. PCT/KR2016/012583 on Nov. 3, 2016, now Pat. No. 11,095,441.

(30) Foreign Application Priority Data

Nov. 3, 2015 (KR) .......................... 10-2015-0154054

(51) Int. Cl.
*H04L 9/08* (2006.01)
*G06F 21/73* (2013.01)
(Continued)

(52) U.S. Cl.
CPC .............. *H04L 9/0869* (2013.01); *G06F 7/58* (2013.01); *G06F 7/588* (2013.01); *G06F 21/70* (2013.01);
(Continued)

(58) Field of Classification Search
CPC ....... H04L 9/0869; H04L 9/0866; H04L 9/32; H04L 9/3278; G06F 7/58; G06F 7/588; G06F 21/70; G06F 21/73
See application file for complete search history.

(56) References Cited

U.S. PATENT DOCUMENTS 5,850,450 A * 12/1998 Schweitzer ............. G06F 21/72
345/503
6,697,829 B1 * 2/2004 Shilton .................... G06F 7/588
708/255

(Continued)

FOREIGN PATENT DOCUMENTS

JP 2013-131867 A 7/2013
KR 10-0926214 B1 11/2009
(Continued)

OTHER PUBLICATIONS

Written Opinion issued in PCT Patent Application No. PCT/KR2016/012583 dated Feb. 21, 2017.
(Continued)

*Primary Examiner* — Taghi T Arani
*Assistant Examiner* — Blake I Narramore

(57) ABSTRACT

Provided is a PUF by which an identification key is generated according to a random event caused by a semiconductor process variation. The PUF can provide the identification key as a result of electrical differences among elements. According to one embodiment, the PUF can accumulate the electrical differences and/or instantaneous values without generating the identification key by using the instantaneous
(Continued)

values caused by the electrical differences. The accumulation may be the accumulation of a discrete iteration and the result thereof. However, according to another embodiment, the accumulation may be a continuation of the accumulation result during time intervals.

6 Claims, 14 Drawing Sheets

(51) Int. Cl.
    *H04L 9/32* (2006.01)
    *G06F 21/70* (2013.01)
    *G06F 7/58* (2006.01)
(52) U.S. Cl.
    CPC ............ *G06F 21/73* (2013.01); *H04L 9/0866* (2013.01); *H04L 9/32* (2013.01); *H04L 9/3278* (2013.01)

(56) References Cited

U.S. PATENT DOCUMENTS

| | | | | |
|---|---|---|---|---|
| 6,831,980 | B1* | 12/2004 | Borza | G06F 7/588 380/46 |
| 7,613,756 | B1* | 11/2009 | Zhu | G06F 7/588 708/250 |
| 9,018,972 | B1* | 4/2015 | Gurrieri | H03K 19/003 326/8 |
| 9,590,626 | B1* | 3/2017 | Pedersen | G01R 27/2605 |
| 2008/0106605 | A1* | 5/2008 | Schrijen | G06F 21/60 348/207.99 |
| 2011/0066670 | A1* | 3/2011 | Yu | H04L 9/3278 708/254 |
| 2011/0299678 | A1* | 12/2011 | Deas | H04L 9/003 380/28 |
| 2013/0093502 | A1 | 4/2013 | Kim et al. | |
| 2014/0095564 | A1 | 4/2014 | Kwak et al. | |
| 2014/0140513 | A1* | 5/2014 | BrightSky | G06F 21/60 380/278 |
| 2014/0327469 | A1* | 11/2014 | Pfeiffer | H03K 19/003 326/8 |
| 2014/0328481 | A1* | 11/2014 | Morioka | H04L 9/0816 380/28 |
| 2015/0006601 | A1* | 1/2015 | Aissi | H04L 63/0428 708/250 |
| 2015/0028847 | A1* | 1/2015 | Vanhoucke | G01R 31/2836 324/72 |
| 2015/0092939 | A1* | 4/2015 | Gotze | G09C 1/00 380/2 |
| 2015/0188717 | A1* | 7/2015 | Wu | H03K 19/003 380/44 |
| 2015/0195088 | A1* | 7/2015 | Rostami | H04L 9/3278 380/28 |
| 2015/0268934 | A1* | 9/2015 | Anderson | G06F 7/588 708/250 |
| 2016/0065379 | A1* | 3/2016 | Holcomb | G09C 1/00 713/189 |
| 2017/0180140 | A1* | 6/2017 | Mai | H04L 9/3278 |

FOREIGN PATENT DOCUMENTS

| | | | | |
|---|---|---|---|---|
| KR | 101169172 B1 * | 3/2011 | ............ | G06F 21/73 |
| KR | 10-1139630 B1 | 5/2012 | | |
| KR | 10-1169172 B1 | 8/2012 | | |
| KR | 2012-0112246 A | 10/2012 | | |

OTHER PUBLICATIONS

International Search Report issued in PCT/KR2016/012583 dated Feb. 21, 2017.
Extended Search Report issued in European Patent Application No. 16862442.7 dated Jun. 12, 2019.
IP.com Search Query; Dec. 7, 2020 (Year: 2020).
KR-101169172-B1 Translation; IP.com; Aug. 2012 (Year: 2012).

* cited by examiner

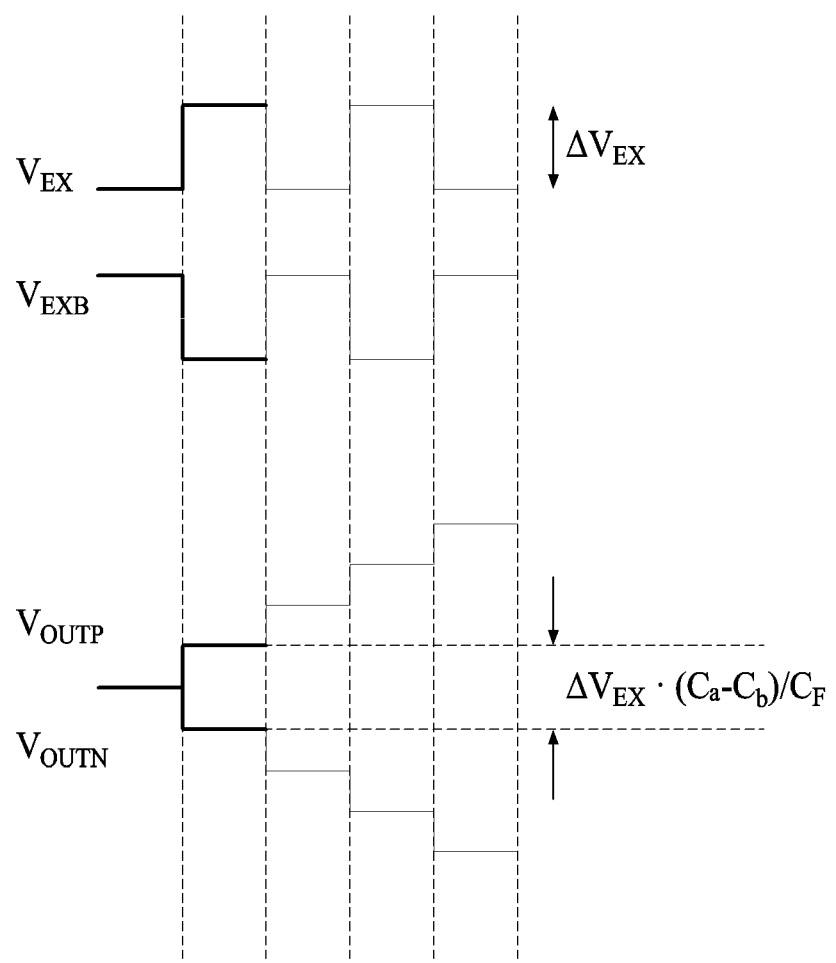

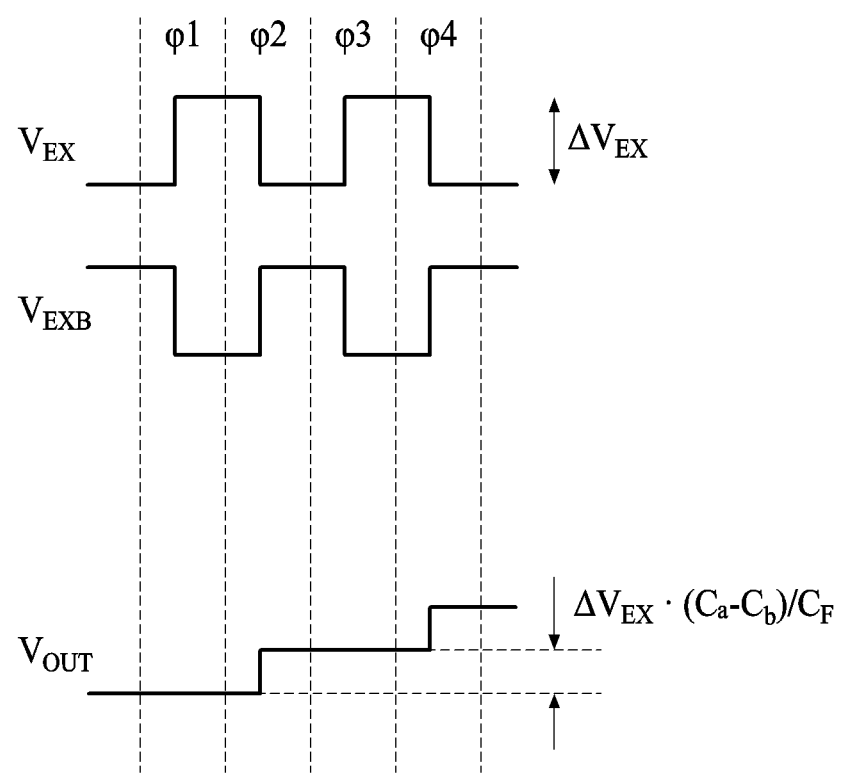

APPARATUS AND METHOD FOR GENERATING IDENTIFICATION KEY

TECHNICAL FIELD

Example embodiments relate to a method and apparatus for generating an identification key, and more particularly, to a method by which a physically unclonable function (PUF) increases a reliability of an identification key.

BACKGROUND

A physically unclonable function (PUF) may provide an unpredictable digital value. Although a manufacturing process is precisely designed and PUFs are manufactured in the same process, the PUFs may provide different digital values. The PUF may also be referred to as physical one-way function practically impossible to be duplicated (POWF).

Such an unduplicable characteristic of the PUF may be applied to generate an identifier of a device for security and/or authentication. For example, the PUF may be used to provide a unique key to distinguish devices from one another.

Korean Patent No. 10-1139630 (hereinafter, referred to as patent '630) and Korean Patent No. 10-0926214 (hereinafter, referred to as patent '214) disclose methods of implementing a PUF. The patent '630 discloses a method of stochastically determining whether to generate inter-layer contact or a via between conductive layers of a semiconductor by using a semiconductor process variation. The patent '214 discloses a method of implementing a PUF based on a fact that current driving capabilities or threshold voltages of two identically designed and manufactured electrical elements are not completely equal due to the semiconductor process variation.

SUMMARY OF THE DISCLOSURE

According to an aspect, there is provided an apparatus for generating an identification key, the apparatus including: a generator configured to provide a random event based on a semiconductor process variation, the event being associated with an electrical property difference; an accumulator configured to perform an accumulation on the random event to provide a cumulative result value; and a reader configured to determine the cumulative result value to be a binary value corresponding to one of 0 and 1 based on a predetermined reference and provide an identification key corresponding to the generator. According to an example embodiment, the electrical property values or the differences between the electrical property values may be accumulated. According to another example embodiment, it is possible to accumulate digital values, for example, binary values generated using a predetermined method based on events. In this example, the binary values of the events may not be provided as an identification key directly. Instead, results corresponding to events may be accumulated such that a result is provided based on a cumulative value. The accumulation may be a discrete iteration and an accumulation of discrete iteration results. Also, the accumulation may indicate an accumulation of results performed analogously for a predetermined period of time.

The random event may include an event that, between two identically designed and manufactured elements, a first element has a greater electrical property value than that of a second element.

Each of the first element and the second element may include a capacitor and the electrical property value may include a capacitance. The accumulator may generate a quantity of charge proportional to a difference between a first capacitance corresponding to the first element and a second capacitance corresponding to the second element. The accumulator may include an integrator configured to accumulate the quantity of charge into an output. The integrator may iterate an accumulation of the quantity of charge into the output a plurality of times until a predetermined condition is satisfied. Also, the integrator may provide a value of the output obtained by iterating the accumulation the plurality of times. According to an example embodiment, the integrator may be a fully differential integrator. According to another example embodiment, the integrator may be a one-ended integrator.

The predetermined condition may include the value of the output being greater than or equal to a threshold. The predetermined condition may include an iteration being performed k times determined in advance, k being a natural number.

Each of the first element and the second element may include a resistor and the electrical property value includes a resistance value. The accumulator may include an integrator configured to accumulate a current proportional to a difference in resistance value into an output. The accumulator may be configured to perform a current integration by accumulating, into an output, a current proportional to a difference between a first resistance value corresponding to the first element and a second resistance value corresponding to the second element until a predetermined condition is satisfied, and provide a value of the output in a case in which the predetermined condition is satisfied.

The predetermined condition may include the value of the output being greater than or equal to a threshold but not limited thereto. The predetermined condition may include the current integration being performed for a predetermined period of time.

According to another aspect, there is also provided an apparatus for generating an identification key, the apparatus including: a generator including a first element having an electrical property value differing from electrical property values of elements designed identically to the first element, based on a semiconductor process variation, wherein an electrical value is output based on whether the electrical property value is greater than a reference value; an accumulator configured to perform an accumulation on the electrical value and provide a cumulative result value; and a reader configured to provide an identification key corresponding to the generator based on the cumulative result value.

The electrical property value may include a resistance value. The accumulator may include an integrator configured to accumulate a current corresponding to the resistance value into an output. The integrator may be configured to perform a current integration by accumulating, into an output, a current proportional to a difference between the first resistance value and the reference value until a predetermined condition is satisfied, and provide a value of the output in a case in which the predetermined condition is satisfied. The predetermined condition may include the current integration being performed for a predetermined period of time.

According to still another aspect, there is also provided a method of operating an identification key generating apparatus to generate an identification key, the method including: generating, by a generator, a random event based on a semiconductor process variation; accumulating a result of the random event using a predetermined scheme and providing a cumulative result value obtained by accumulating a result value of the random event; and reading an identification key corresponding to the identification key generating apparatus using the cumulative result value. The random event may include an event that, between two identically designed and manufactured elements, a first element has a greater electrical property value than that of a second element.

Each of the first element and the second element may include a capacitor and the electrical property value may include a capacitance. The accumulating may include generating a quantity of charge proportional to a difference between a first capacitance corresponding to the first element and a second capacitance corresponding to the second element and iterating an accumulation of the quantity of charge into an output a plurality of times until a predetermined condition is satisfied.

Each of the first element and the second element may include a resistor and the electrical property value includes a resistance value. The accumulating may include performing a current integration by accumulating, into an output, a current proportional to a difference between a first resistance value corresponding to the first element and a second resistance value corresponding to the second element until a predetermined condition is satisfied. The predetermined condition may include the current integration being performed for a predetermined period of time. Also, the predetermined condition may include the accumulating repetitively performed until the value of the output is greater than or equal to a threshold.

BRIEF DESCRIPTION OF DRAWINGS

FIGS. 7A through 9 are diagrams illustrating a process of providing an identification key by accumulating electrical property value differences in the example embodiment of FIG. 6.

DETAILED DESCRIPTION

Hereinafter, example embodiments will be described in detail with reference to the accompanying drawings. It should be understood, however, that there is no intent to limit this disclosure to the particular example embodiments disclosed. Like numbers refer to like elements throughout the description of the figures. Terminologies used herein are defined to appropriately describe the example embodiments of the present disclosure and thus may be changed depending on a user, the intent of an operator, or a custom. Accordingly, the terminologies must be defined based on the following overall description of this specification.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
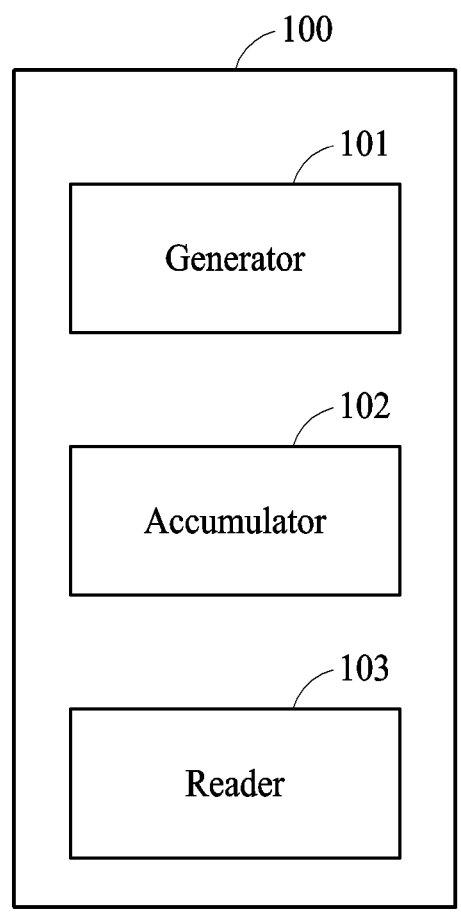
FIG. 1 is a block diagram illustrating an identification key generating apparatus according to an example embodiment.

FIG. 1 is a block diagram illustrating an apparatus 100 for generating identification key according to an example embodiment. The apparatus 100 may include a generator 101 configured to provide a random event based on a semiconductor process variation. Here, the event may be associated with an electrical property difference. An electrical property may be, but not limited to, a resistance value of a resistor corresponding to a passive element, a capacitance of a capacitor, a current drive capability of an active device such as a transistor, and a threshold voltage. The generator 101 may intrinsically provide the electrical property or an electrical property difference value between elements. A difference in electrical property value may occur due to the semiconductor process variation.

The difference in electrical property value may correspond to a significantly small value. Thus, the electrical property value may be changed by various environmental factors such as thermal noise, aging of an element, a disturbance such as an electromagnetic wave. When a unique identification key is generated by a value of a physically unclonable function (PUF) using the electrical property value or the electrical property difference value between elements, a change due to the aforementioned environmental factors may cause an undesirable result. Hereinafter, the identification key may include a digital value such as a secret key for authentication, a personal key, a unique ID of a device, and the like. When the identification key is changed, it may be a challenge for a reliability of a PUF and a security apparatus including the PUF. Thus, a time invariance in which the identification value corresponding to the PUF value does not change over time may need to be ensured.

The apparatus 100 may include an accumulator 102 that provides a cumulative result value by accumulating events provided by the generator 101. According to an example embodiment, the electrical property values or the differences between the electrical property values may be accumulated. Such accumulation may indicate that analog electrical properties, for example, a quantity of charge, current, and a potential difference are integrated in an electric circuit.

However, the integration performed on the quantity of charge and/or the current in the electrical circuit is merely an example. According to another example embodiment, it is possible to accumulate digital values, for example, binary values generated using a predetermined method based on events. In this example, the binary values of the events may not be provided as an identification key directly. Instead, results corresponding to events may be accumulated such that a result is provided based on a cumulative value. The accumulation may be a discrete iteration and an accumulation of discrete iteration results. However, the accumulation may indicate not only the discrete iteration and the accumulation of discrete iteration results, but also an accumulation of results performed analogously for a predetermined period of time.

A reader 103 may determine the cumulative result value to be a binary value corresponding to one of 0 and 1 based on a predetermined reference and provide the determined binary value as an identification key corresponding to the generator 101. In a related art, a general PUF may read an event intrinsically provided by the generator 101 and use the event as a PUF value. In the present disclosure, the apparatus 100 may accumulate, using the accumulator 102, electric properties or property difference values generated by the generator 101, and allow the reader 103 to provide an identification key using a cumulative result. Examples of the generator 101 and the accumulator 102 will be further described with reference to the following drawings.

Figure 2:
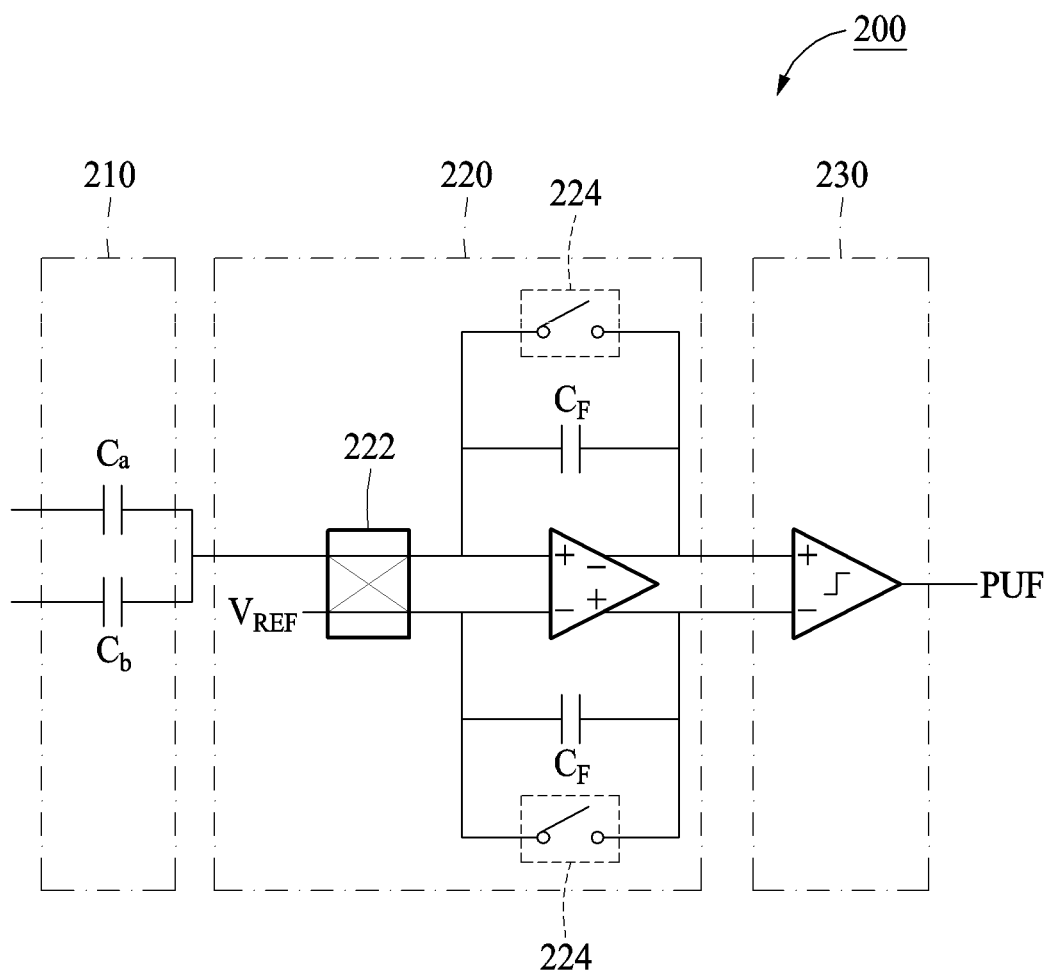
FIG. 2 is a circuit diagram illustrating an example of implementing an identification key generating apparatus according to an example embodiment.

FIG. 2 is a circuit diagram illustrating an example of implementing an identification key generating apparatus according to an example embodiment. An event may include, for example, an event that, between two identically designed and manufactured elements, a first element has a greater electrical property value than that of a second element. Each of the first element and the second element may include a capacitor and the electrical property value may include a capacitance.

Referring to FIG. 2, a generator 210 may include a capacitor Ca that is a first element and a capacitor Cb that is a second element. When a voltage is applied to the generator 210, a quantity of charge proportional to a difference between a first capacitance of the capacitor Ca and a second capacitance of the capacitor Cb may be accumulated in an accumulator 220. A reader 230 may provide a PUF value, for example, binary value based on am accumulated result value using a comparator. An operation method will be further described with reference to the following drawings, starting from FIG. 3

FIGS. 3 through 5B are diagrams illustrating a process of providing an identification key by accumulating differences in electrical property value in the example embodiment of FIG. 2. In the example of FIG. 2, the accumulator 220 may include a fully differential integrator. A circuit illustrated in the drawing is merely an example of the fully differential integrator and thus, integrators having various structures are also applicable thereto.

Figure 3:
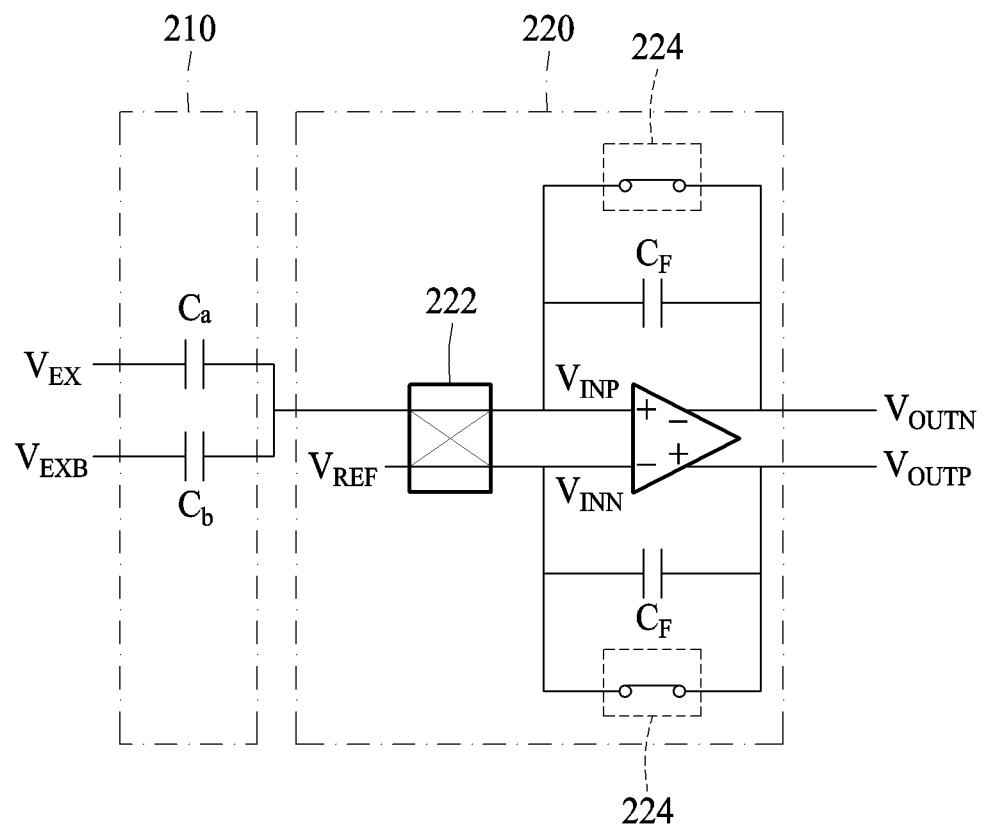
FIGS. 3 through 5B are diagrams illustrating a process of providing an identification key by accumulating electrical property value differences in the example embodiment of FIG. 2.

Referring to FIG. 3, when a reset switch 224 is closed, for example, switched on in response to a connection, voltages of VINP, VINN, VOUTP, VOUTN, and VREF may have the same value. In this example, a quantity of charge remaining in a capacitor CF may be totally discharged. A process in which the reset switch 224 is closed may be understood as a process in which a circuit is initialized before an accumulation is performed.

Figure 4A:
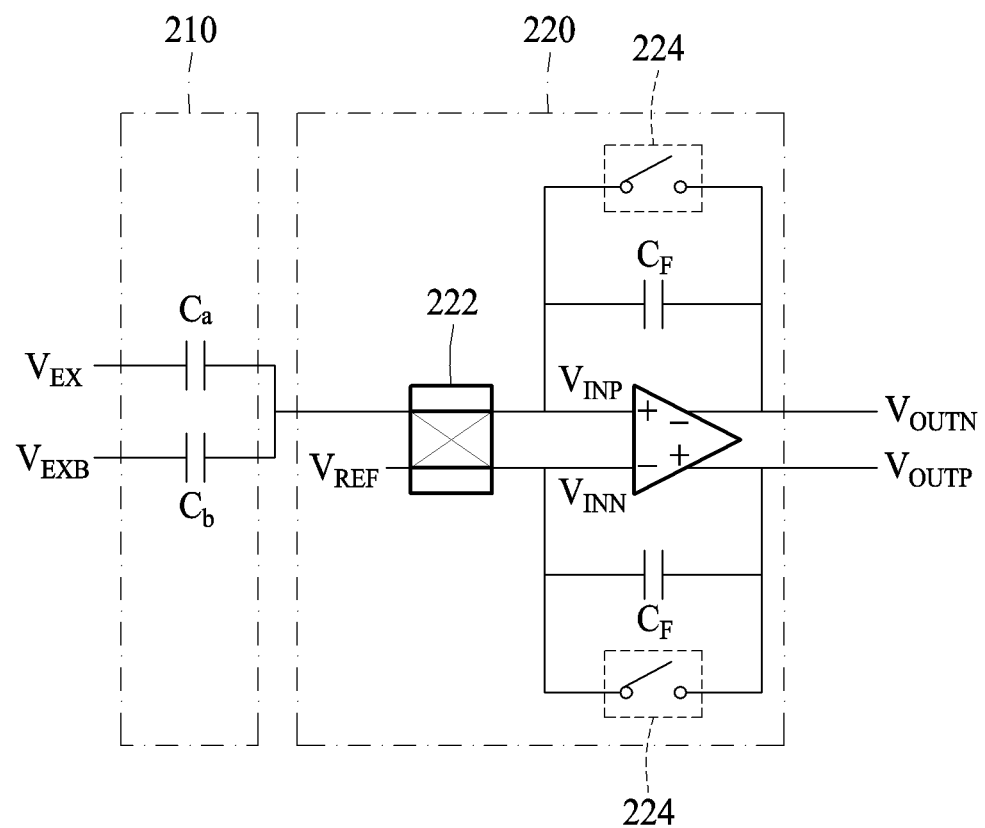

Referring to FIG. 4A, the reset switch 224 may be open, for example, switched off. In this example, voltages of VINP, VINN, and VREF may have the same value. Also, in the capacitor CF, a quantity of charge proportional to a capacitance difference between the capacitor Ca that is a first element and the capacitor Cb that is a second element may be accumulated. The quantity of charge accumulated in the capacitor CF may be represented by voltage values of VOUTP and VOUTN corresponding to output voltages.

Referring to FIGS. 4A and 4B, when $\Delta$VEX that is a voltage difference of VEX is applied to the first element Ca, a node in a direction in which $\Delta$VEX of the first element Ca is applied may be charged with Qa, which is a positive charge quantity corresponding to a result of multiplication of $\Delta$VEX and a first capacitance of the first element Ca. Since two-directional nodes of the first element Ca are to be charged with the same quantity of charge having different polarities, a VINP-directional node may be charged with Qa, which is a negative charge quantity. In FIG. 4B, when $-\Delta$VEX that is a voltage difference of VEXB is applied to the second element Cb, a VEXB-directional node of the second element Cb may be charged with Qb, which is a negative charge quantity corresponding to a result of multiplication of $\Delta$VEX and a second capacitance of the second element Cb. Since two-directional nodes of the second element Cb are to be charged with the same quantity of charge having different polarities, a VINP-directional node may be charged with Qb, which is a positive quantity charge. Through this, $-\Delta$Q that is a total change in the quantity of charge in the VINP-directional node may correspond to a value of $-(Qa-Qb)$. That is, a value of $\Delta$Q may have a magnitude of "$\Delta$VEX·(Ca–Cb)" corresponding to a value obtained by multiplying $\Delta$VEX by a magnitude obtained by subtracting the second capacitance of the second element Cb from the first capacitance of the first element Ca. In this example, to maintain a total charge of VINP at a value of 0, a total quantity of charge in two directional nodes of the capacitor CF may be changed by $+\Delta$Q having a value of "$\Delta$VEX·(Ca–Cb)."

$+^\Delta$Q may cause different operations of output voltages in a common-mode and a differential mode based on operations of a differential amplifier. A common-mode change may not affect a differential operation. In terms of a differential-mode change, values of VOUTP and VOUTN corresponding to the output voltages may be changed to satisfy a quantity of charge corresponding to the change. VOUTP may be changed to a value obtained by dividing a value of a half of $+^\Delta$Q by a magnitude of a capacitance of the capacitor CF. VOUTN may be changed to a value obtained by dividing a value of a half of $-^\Delta$Q by the magnitude of the capacitance of the capacitor CF. The changed values of the output voltages may correspond to outputs of the accumulator 220 in the examples of FIGS. 2, 3, and 4A.

Figure 5A:
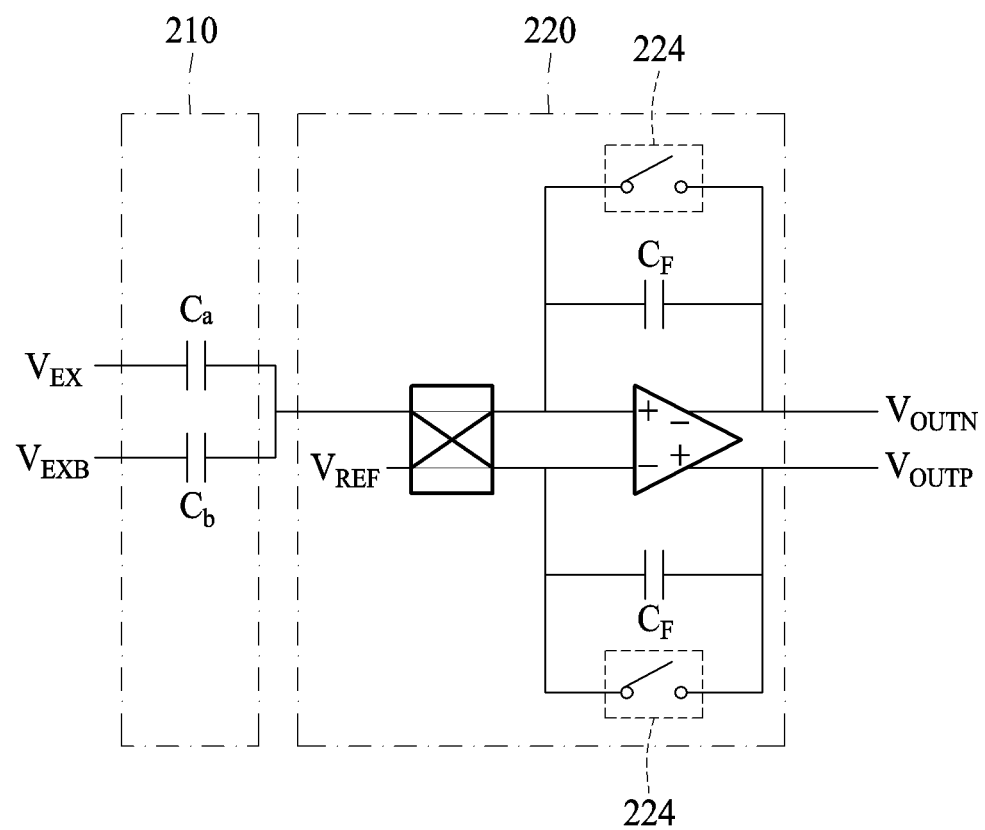
Figure 5B:
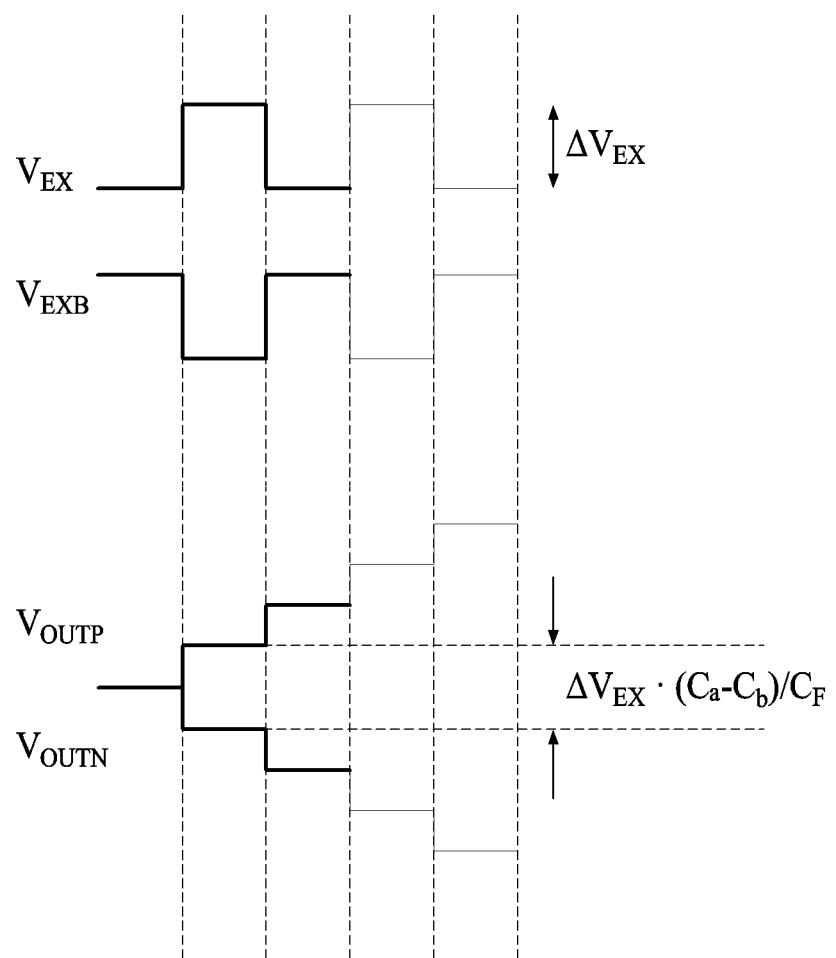

Referring to FIGS. 5A and 5B, when $-^\Delta$VEX that is a voltage difference of VEX is applied to the first element Ca, a VEX-directional node may be charged with Qa, which is a negative charge quantity corresponding to a result of multiplication of $\Delta$VEX and a first capacitance of the first element Ca. Since two-directional nodes of the first element Ca are to be charged with the same quantity of charge having different polarities, a VINP-directional node may be charged with Qa, which is a positive charge quantity.

As described with reference to FIG. 4B, when a voltage difference of VEXB is applied by $\Delta$VEX, a VEXB-directional node of the second element Cb may be charged with Qb, which is a positive charge quantity corresponding to a result of multiplication of $\Delta$VEX and a second capacitance of the second element Cb. Since two-directional nodes of the second element Cb are to be charged with the same quantity of charge having different polarities, a VINP-directional node may be charged with Qb, which is a negative quantity charge. Through this, $\Delta$Q that is a total change in the quantity of charge in the VINP-directional node may correspond to a value of "Qa–Qb". That is, a value of $\Delta$Q may have a magnitude of "$\Delta$VEX·(Ca–Cb)" corresponding to a value obtained by multiplying $\Delta$VEX by a magnitude obtained by subtracting the second capacitance of the second element Cb from the first capacitance of the first element Ca.

To maintain a total charge of VINP at a value of 0, a total quantity of charge in two directional nodes of the capacitor CF may be changed by $-\Delta$Q having a value of "$\Delta$VEX·(Ca–Cb)."$-\Delta$Q may cause different operations of output voltages in a common-mode and a differential mode based on operations of a differential amplifier. A common-mode change may not affect a differential operation.

In terms of a differential-mode change, values of VOUTP and VOUTN corresponding to the output voltages may be changed to satisfy a quantity of charge corresponding to the change. VOUTP may be changed to a value obtained by dividing a value of a half of $+\Delta Q$ by a magnitude of a capacitance of the capacitor CF. VOUTN may be changed to a value obtained by dividing a value of a half of $-\Delta Q$ by the magnitude of the capacitance of the capacitor CF. The changed values of the output voltages may correspond to outputs of the accumulator 220 in the examples of FIGS. 2, 3, and 5A.

Figure 6:
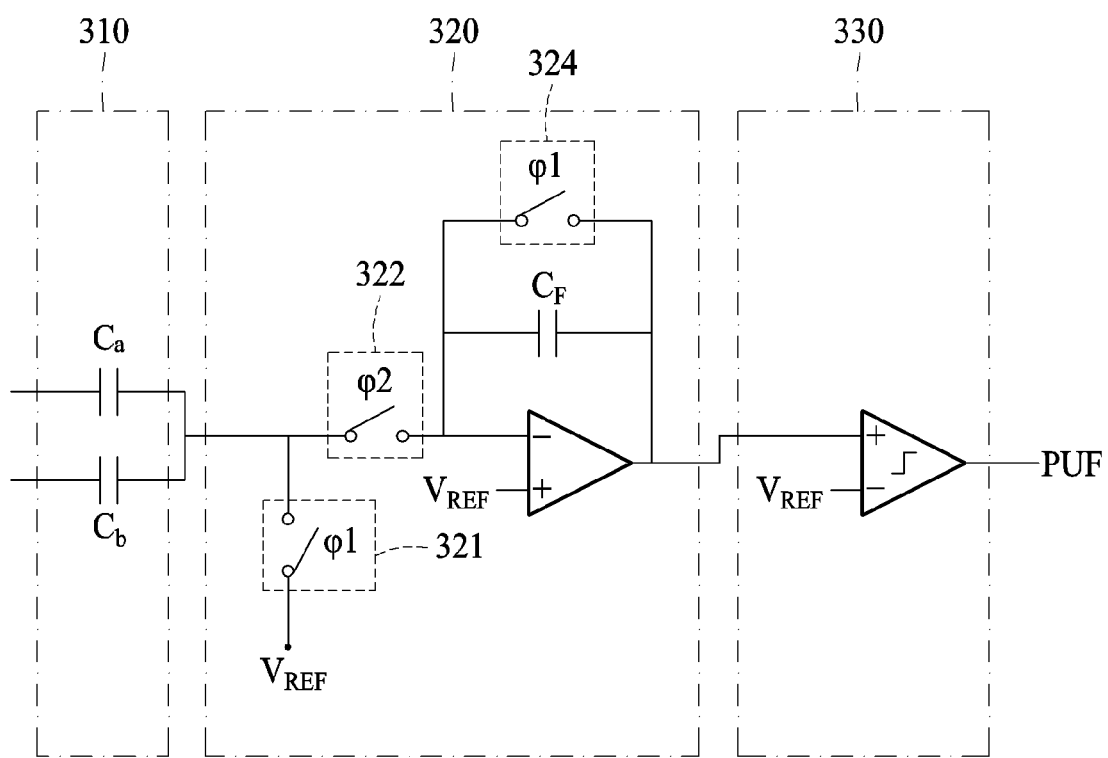
FIG. 6 is a circuit diagram illustrating an example of implementing an identification key generating apparatus according to an example embodiment.

Although an integrator is described as a fully differential integrator in the above examples, a one-ended integrator is also applicable thereto. FIG. 6 is a circuit diagram illustrating an example of implementing an identification key generating apparatus according to an example embodiment. In the present example, an integrator may be the one-ended integrator.

Similar to the above description, in a generator 310, electric property values may be accumulated due to a capacitance difference between a capacitor Ca and a capacitor Cb. An accumulator 320 may include switches 321 and 322 configured to select a phase to allow an output to increase or decrease in one direction. Also, the accumulator 320 may include a reset switch 324 configured to initialize a circuit by fully discharging a quantity of charge remaining in a capacitor CF when the reset switch 324 is switched on. A structure of the accumulator 320 illustrated in the drawing is merely an example of implementing a single-ended integrator and single-ended integrator in other structures are also applicable thereto. When the accumulator 320 accumulates a quantity of charge corresponding to the capacitance difference between the capacitor Ca and the capacitor Cb as a result value, a reader 330 may compare a cumulative result to VREF to read an identification key.

Figure 7A:
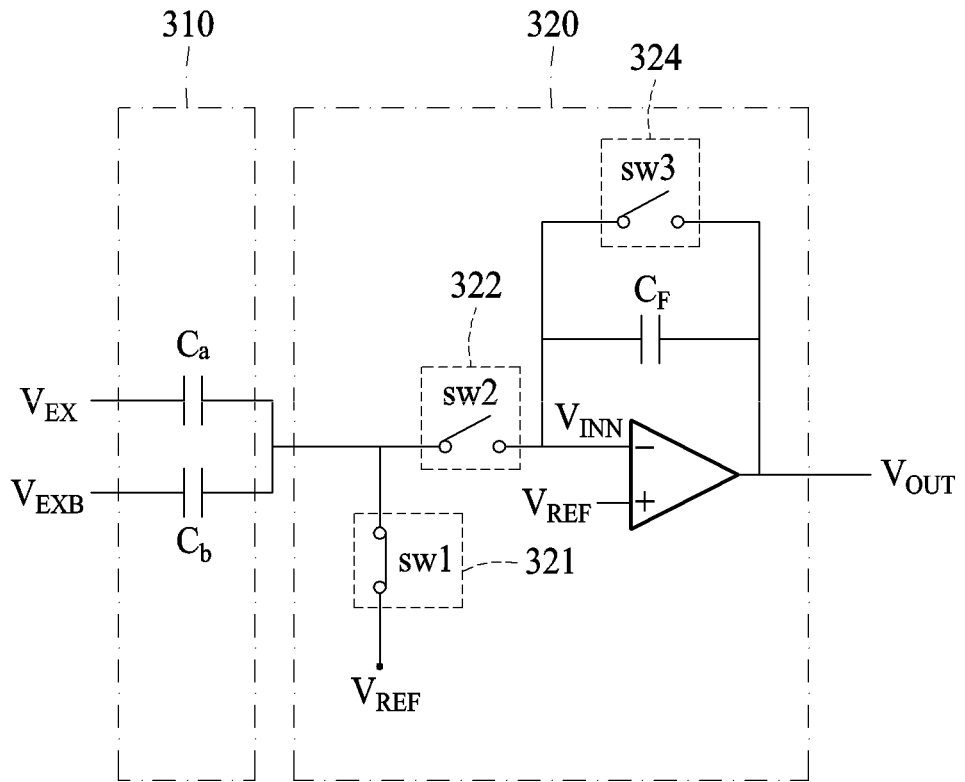

FIGS. 7A through 9 are diagrams illustrating a process of providing an identification key by accumulating electrical property value differences in the example embodiment of FIG. 6. Referring to FIGS. 7A and 7B, a switch sw1 321 may be in an on state, a switch sw2 322 may be in an off state, and a reset switch sw3 324 may be in the off state. Although a quantity of charge to be charged in each of the first element Ca and the second element Cb is changed in response to a change in voltage of each of VEX and VEXB corresponding to voltages, because the switch sw2 322 is in the off state, the changes in voltage of VEX and VEXB may be transferred to Vref via the switch sw1 321 instead of an amplifier. In this example, a change in voltage applied to each of VEX and VEXB may be a voltage difference of $+\Delta$VEX and $-\Delta$VEXB at a point in time of $\varphi 1$ (Phase1) as illustrated in FIG. 7B. A cumulative quantity of charge in the capacitor CF may be fully discharged using the reset switch 324.

Figure 8A:
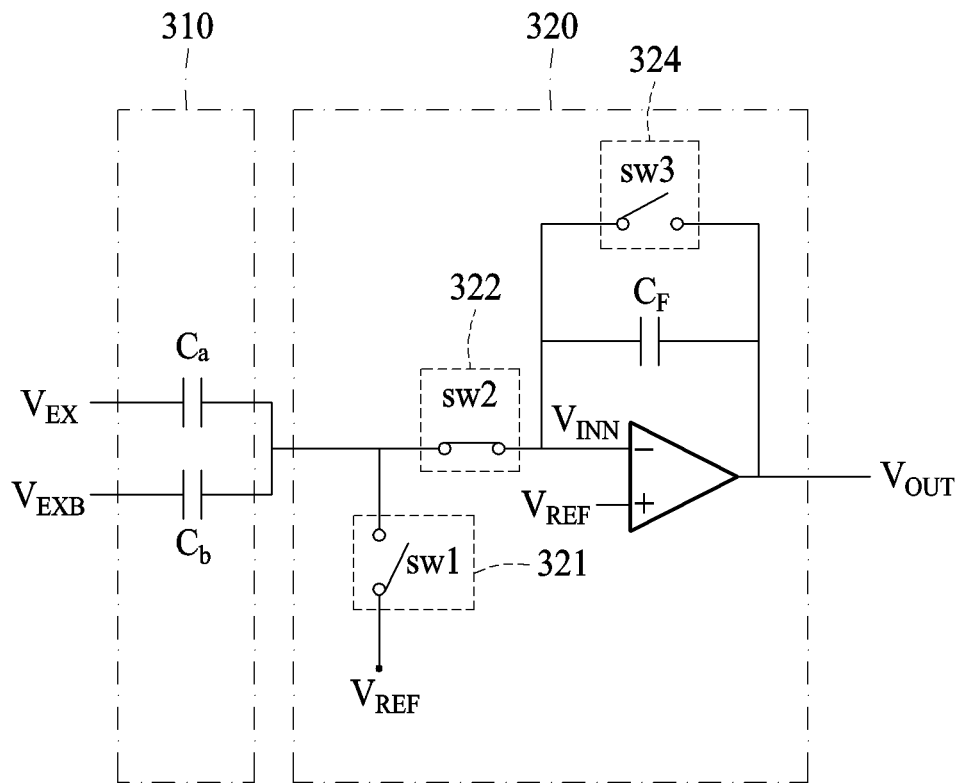
Figure 8B:
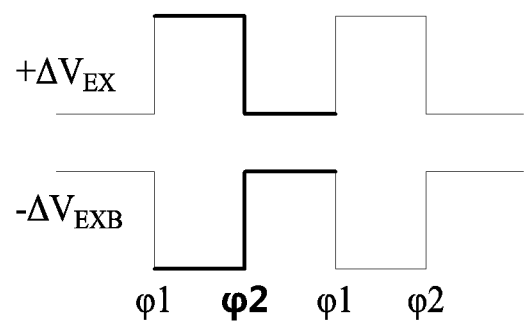

Referring to FIGS. 8A and 8B, the switch sw1 321 may be in the off state, the switch sw2 322 may be in the on state, and the reset switch sw3 324 may be in the off state. In response to a change in voltage of each of VEX and VEXB corresponding to voltages, a quantity of charge to be charged in each of the first element Ca and the second element Cb may be changed. In this example, it is assumed that changes in the quantities of charge are magnitudes of Qa and Qb. To maintain a total quantity of charge in a node of VINP at a value of 0, changes in quantities of charge having the same magnitude as a value obtained by subtracting a quantity of charge Qb in the second element Cb from a quantity of charge Qa in the first element Ca and opposite polarities may occur in the capacitor CF.

Figure 7B:
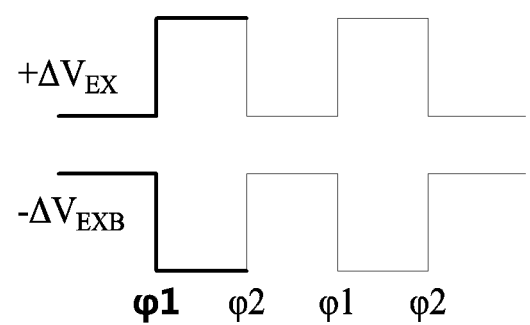

Here, $+\Delta Q$ may be the value obtained by subtracting a quantity of charge Qb in the second element Cb from a quantity of charge Qa in the first element Ca. In this example, a node in a direction in which the node is connected to VINN of the capacitor CF may be changed with a quantity of change corresponding to a magnitude of $-\Delta Q$, and a VOUT-directional node opposite to the node may be charged with a quantity of charge corresponding to a magnitude of $+\Delta Q$. In response to the quantity of charge being charged in the VOUT-directional node by $+\Delta Q$, a voltage change corresponding to a value obtained by multiplying VEX which is a voltage by a value obtained by dividing a difference between the first capacitance of the first element Ca and the second capacitance of the second element Cb by a magnitude of a capacitance of the capacitor CF may occur in a node of VOUT. Such values of changes in output voltages may correspond to outputs of the accumulator 320 in the examples of FIGS. 6, 7A, and 8A. In this instance, a change in voltage applied to each of VEX and VEXB may be a voltage difference of $+\Delta$VEX and $-\Delta$VEXB corresponding to a point in time of $\varphi 2$ (Phase2) as illustrated in FIG. 7B.

Referring to FIG. 9, in $\varphi 1$ (Phase1), an accumulation may not be performed in the accumulator 320 of the identification key generating apparatus. Also, only in $\varphi 2$ (Phase2), the accumulation may be repetitively performed in the accumulator 320 of the identification key generating apparatus. In this example, a magnitude by which the accumulation is performed may be changed based on a magnitude of (Ca–Cb) corresponding to a difference between the first capacitance of the first element Ca and the second capacitance of the second element Cb, and correspond to a size of a process variation.

Such accumulation of a quantity of charge may be repetitively and/or consistently performed while a predetermined condition is satisfied. In an example, the predetermined condition may include a cumulative output value being greater than or equal to a threshold. The threshold may be sufficient to ensure a PUF value remaining the same irrespective of an external environmental factor such as noise or an internal factor such as an aging of an element. In another example, the predetermined condition may be an iteration performed k times, k being a natural number. An iteration count k may be determined based on a process and/or a predetermined element or an element specification. Also, an optimal value may be determined through the iteration performed by those skilled in the art.

Figure 10:
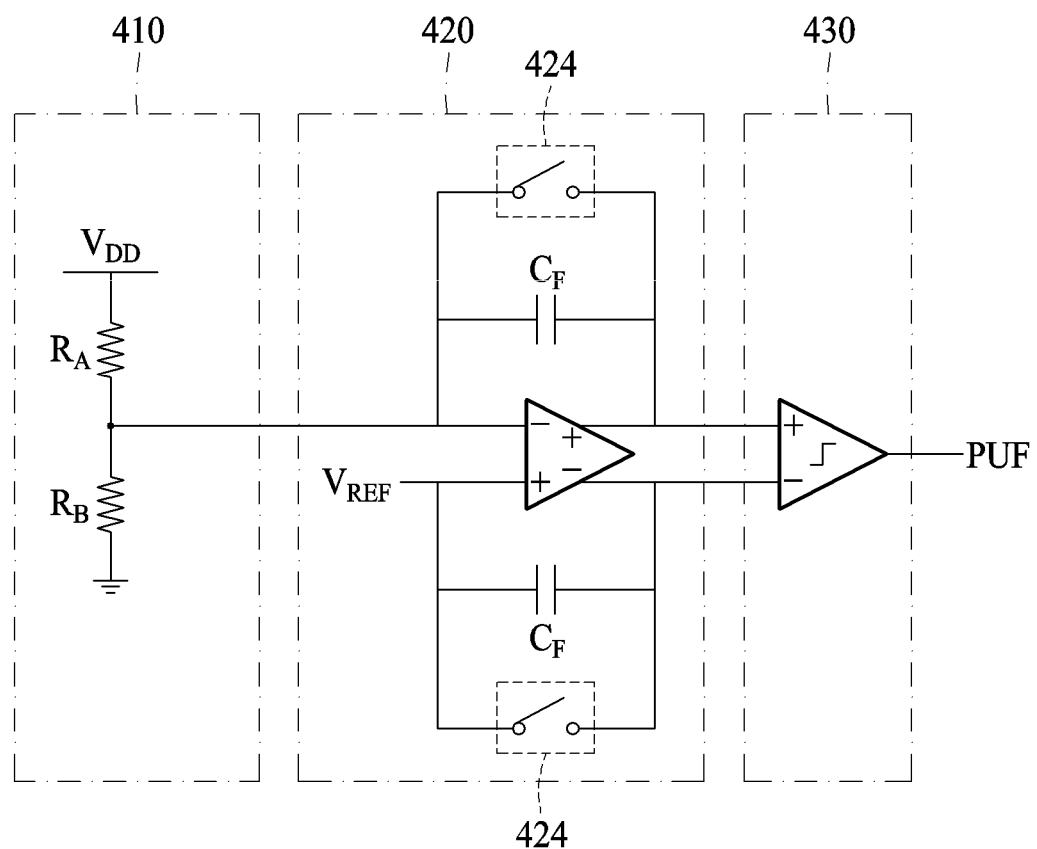
FIG. 10 is a circuit diagram illustrating an example of implementing an identification key generating apparatus according to an example embodiment.

FIG. 10 is a circuit diagram illustrating an example of implementing an identification key generating apparatus according to an example embodiment. In the present example, a first element and a second element of which electrical properties are compared to each other may be resistors. The resistors may include the resistors RA and RB which are designed to have the same size in a generator 410 and have resistance values not to be completely equal due to process variations. The compared electrical property values may be the resistance values. An accumulator 420 may include an integrator configured to accumulate current proportional to a difference between the resistance values into an output. The integrator may perform a current integration by accumulating current proportional to a difference between a first resistance value of the resistor RA and a second resistance value of the resistor RB into an output. Also, the integrator may consistently perform the current integration until a predetermined condition is satisfied, and then provide an output value obtained therefrom. A reader 430 may provide a PUF value, for example, a binary value based on a cumulative result value using a comparator.

In an example, the predetermined condition may include a cumulative output value being greater than or equal to a threshold. The threshold may be sufficient to ensure a PUF value remaining the same irrespective of an external environmental factor such as noise or an internal factor such as an aging of an element. In another example, the predetermined condition may be the current integration performed for a predetermined period of time. The period of time may be determined based on a process and/or a predetermined element or an element specification. Also, an optimal value may be determined through the iteration performed by those skilled in the art.

Figure 11A:
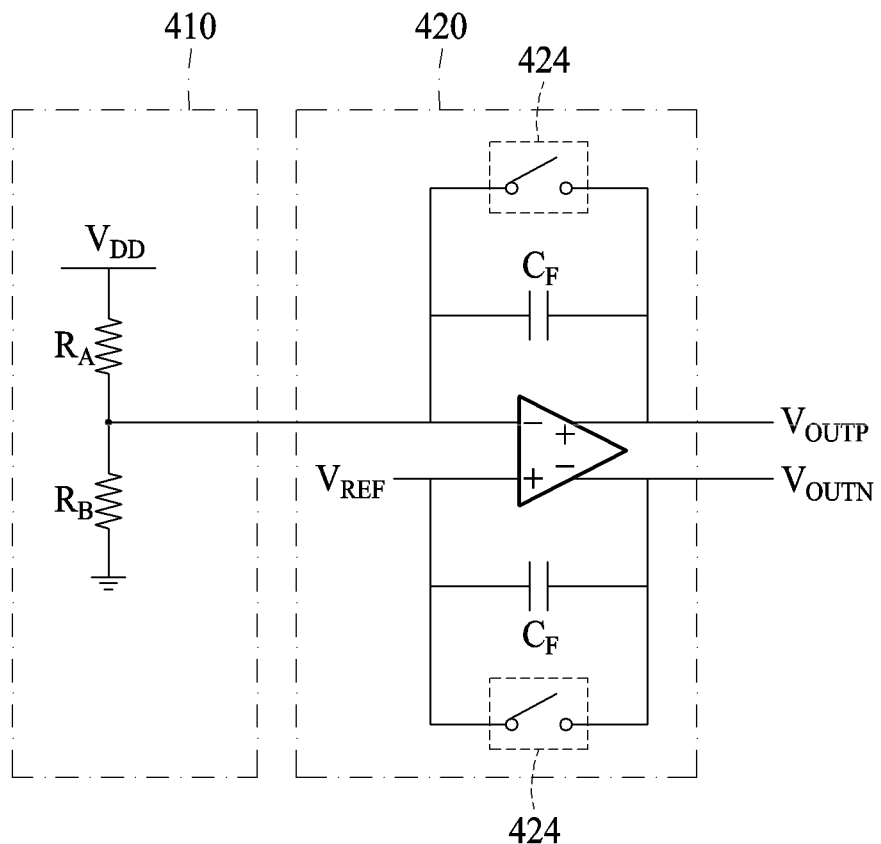
FIGS. 11A and 11B are diagrams illustrating a process of providing an identification key by accumulating electrical property value differences in the example embodiment of FIG. 10.
Figure 11B:
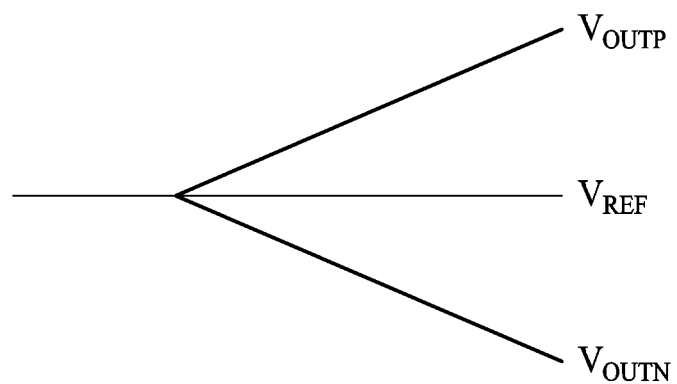

FIGS. 11A and 11B are diagrams illustrating a process of providing an identification key by accumulating electrical property value differences in the example embodiment of FIG. 10. When a reset switch 424 is switched on, a quantity of charge remaining in the capacitor CF may be fully discharged such that a circuit is initialized. Referring to FIGS. 11A and 11B, a current flowing in the capacitor CF of the accumulator 420 may be proportional to a value obtained by differentiating a voltage difference between both ends of the capacitor CF with respect to time. In this example, a constant current flowing in the capacitor CF may indicate that the value obtained by differentiating the voltage difference between the both ends of the capacitor CF is a constant value.

When the current generated proportionally to magnitudes of the resistors RA and RB of the generator 410 flows in the capacitor CF of the accumulator 420, the value obtained by differentiating the voltage difference between the both ends of the capacitor CF may change. In the accumulator 420, because an input voltage of an amplifier maintains a value of VREF that is a voltage through an operation of a negative feedback, the value obtained by differentiating the voltage difference between the both ends of the capacitor CF may generate VOUTP and VOUTN corresponding to output voltages. Changes in an output voltage value may be continuously accumulated by the lapse of time. Such values of the changes in the output voltages may correspond to outputs of the accumulator 420 in the example of FIGS. 10 and 11A. FIG. 11B illustrates values of VOUTP and VOUTN corresponding to the output voltages of the accumulator 420, the values which are accumulated based on an operation of the identification generating apparatus of FIG. 11A.

In FIG. 11A, the current flowing in the capacitor CF may not affect VOUTP and VOUTN corresponding to output voltages in a common-mode while a current difference occurs in a differential-mode, which may lead to changes in VOUTP and VOUTN corresponding to the output voltages. In FIG. 11B, gradients of changes in VOUTP and VOUTN may correspond to a magnitude obtained by dividing, by a capacitance value of the capacitor CF, a half of a current difference value based on a resistance difference occurring due to a process variation of each of the resistors RA and RB of FIG. 10.

Figure 12:
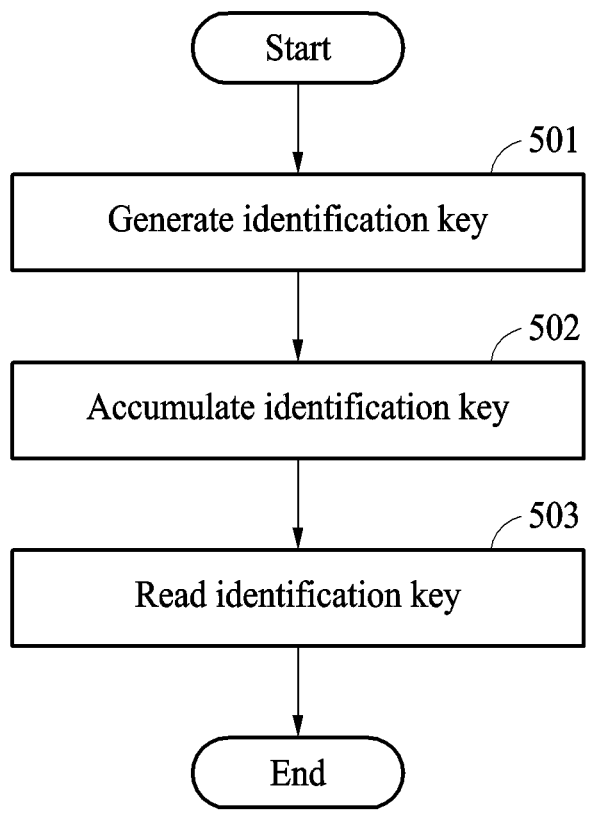
FIG. 12 is a flowchart illustrating a method of operating an identification key generating apparatus according to an example embodiment.

FIG. 12 is a flowchart illustrating a method of operating an identification key generating apparatus according to an example embodiment. According to an example embodiment, a method of generating an identification key using an identification key generating apparatus may be provided. The method may include: operation 501 in which a generator generates a random event based on a semiconductor process variation; operation 502 of performing an accumulation on a result of the event using a predetermined scheme and providing a cumulative result value obtained through the accumulation; and operation 503 of reading an identification key corresponding to the identification key generating apparatus using the cumulative result value.

In operation 501, electrical properties of elements or electrical property differences between elements may occur based on the semiconductor process variation. For example, between two identically designed and manufactured elements, a first element may have a greater electrical property value than that of a second element. For example, each of the first element and the second element includes a capacitor and the electrical property value includes a capacitance. In operation 502, the electrical properties or the electrical property differences may be accumulated as a result value. Such accumulation may include a process of generating a quantity of charge proportional to a difference between a first capacitance corresponding to the first element and a second capacitance corresponding to the second element and a process of repetitively accumulating the quantity of charge into an output a plurality of times until a predetermined condition is satisfied.

In an example, each of the first element and the second element may include a resistance and the electrical property value may include a resistance value. In this example, a process of repetitively perform a current integration by accumulating currents proportional to a difference between a first resistance value corresponding to the first element and a second resistance value corresponding to the second element into an output until a predetermined condition is satisfied may be performed in operation 502. Here, the predetermined condition may be to perform the current integration for a predetermined period of time. Depending on an example, the condition may include the accumulation continuously performed until a value of the output is greater than or equal to a threshold.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for generating an identification key, the apparatus comprising:
   a generator configured to provide a random event based on a semiconductor process variation, the random event being associated with an electrical property difference;
   an accumulator configured to perform an accumulation on the random event to provide a cumulative result value; and
   a reader configured to determine the cumulative result value to be a binary value corresponding to one of 0 and 1 based on a predetermined reference and provide an the identification key corresponding to the generator,
   wherein the random event includes an event that, between two identically designed and manufactured elements, a first element has a greater electrical property value than that of a second element, and
   wherein each of the first element and the second element includes a resistor and the electrical property value includes a resistance value,
   wherein the accumulator comprises:
   an integrator configured to perform a current integration by accumulating, into an output, a current proportional to a difference between a first resistance value corresponding to the first element and a second resistance value corresponding to the second element until a predetermined condition is satisfied, and provide a value of the output in a case in which the predetermined condition is satisfied.

2. The apparatus of claim 1, wherein the predetermined condition includes the value of the output being greater than or equal to a threshold.

3. The apparatus of claim 1, wherein the predetermined condition includes the current integration being performed for a predetermined period of time.

4. An apparatus for generating an identification key, the apparatus comprising:
   a generator including a first element having an electrical property value differing from electrical property values of elements designed identically to the first element, based on a semiconductor process variation, wherein an electrical value is output based on whether the electrical property value is greater than a reference value;
   an accumulator configured to perform an accumulation on the electrical value and provide a cumulative result value; and
   a reader configured to provide the identification key corresponding to the generator based on the cumulative result value,
   wherein the electrical property value includes a resistance value,
   wherein the accumulator comprises:
   an integrator configured to perform a voltage distribution of a power source voltage based on a ratio between a first resistance value corresponding to the first element and the reference value, perform a current integration by accumulating, into an output, a current proportional to a difference between the first resistance value and the reference value until a predetermined condition is satisfied, and provide a value of the output in a case in which the predetermined condition is satisfied.

5. The apparatus of claim 4, wherein the predetermined condition includes the current integration being performed for a predetermined period of time.

6. A method of operating an identification key generating apparatus, the method comprising:
   generating, by a generator, a random event based on a semiconductor process variation;
   accumulating a result of the random event using a predetermined scheme and providing a cumulative result value obtained by accumulating a result value of the random event; and
   reading an identification key corresponding to the identification key generating apparatus using the cumulative result value,
   wherein the random event includes an event that, between two identically designed and manufactured elements, a first element has a greater electrical property value than that of a second element, and
   wherein each of the first element and the second element includes a resistor and the electrical property value includes a resistance value,
   wherein the accumulating is performed by using performing a current integration by:
   accumulating, into an output, a current proportional to a difference between a first resistance value corresponding to the first element and a second resistance value corresponding to the second element until a predetermined condition is satisfied, and
   providing a value of the output in a case in which the predetermined condition is satisfied.

* * * * *